US011042197B2

United States Patent
Li et al.

(10) Patent No.: US 11,042,197 B2
(45) Date of Patent: Jun. 22, 2021

(54) COMPOSITE HINGE ASSEMBLY, MULTI-FUNCTIONAL KEYPAD AND TABLET COMPUTER KIT

(71) Applicant: JRD COMMUNICATION (SHENZHEN) LTD, Guangdong (CN)

(72) Inventors: Bingquan Li, Guangdong (CN); Li Zong, Guangdong (CN); Aijun Zou, Guangdong (CN)

(73) Assignee: JRD COMMUNICATION (SHENZHEN) LTD, Shenzhen (CN)

( * ) Notice: Subject to any disclaimer, the term of this patent is extended or adjusted under 35 U.S.C. 154(b) by 249 days.

(21) Appl. No.: 16/309,938

(22) PCT Filed: Oct. 9, 2017

(86) PCT No.: PCT/CN2017/105406
§ 371 (c)(1),
(2) Date: Dec. 14, 2018

(87) PCT Pub. No.: WO2018/086432
PCT Pub. Date: May 17, 2018

(65) Prior Publication Data
US 2020/0183462 A1 Jun. 11, 2020

(30) Foreign Application Priority Data
Nov. 10, 2016 (CN) .......................... 201610989652.1

(51) Int. Cl.
*G06F 1/16* (2006.01)
*G06F 3/02* (2006.01)

(52) U.S. Cl.
CPC .......... *G06F 1/1681* (2013.01); *G06F 1/1616* (2013.01); *G06F 1/1626* (2013.01); *G06F 1/1632* (2013.01); *G06F 3/0219* (2013.01)

(58) Field of Classification Search
CPC .... G06F 1/1681; G06F 1/1632; G06F 1/1669; G06F 3/0219
See application file for complete search history.

(56) References Cited

U.S. PATENT DOCUMENTS 8,599,542 B1 * 12/2013 Healey .................. G06F 1/1626
361/679.17
8,817,457 B1 * 8/2014 Colby .................. G06F 1/1681
361/679.29
(Continued)

FOREIGN PATENT DOCUMENTS

CN 102890542 A 1/2013
CN 203858589 U 10/2014
(Continued)

OTHER PUBLICATIONS

1st Office Action of counterpart European Patent Application No. 178700324 dated Nov. 13, 2020.

*Primary Examiner* — Anthony Q Edwards

(57) ABSTRACT

The present disclosure discloses a composite hinge assembly, comprising a clamping portion and a rotating shaft portion fixed relative to the clamping portion and extending out of the two ends of the clamping portion. An inner surface of the clamping portion defining a slot, and an outer surface of the clamping portion is a damping layer made of an elastic material. The present disclosure also discloses a tablet computer kit and a multi-functional keypad thereof.

20 Claims, 8 Drawing Sheets

(56) References Cited

U.S. PATENT DOCUMENTS

| | | | |
|---|---|---|---|
| 9,086,841 B1 | 7/2015 | Yu et al. | |
| 9,645,608 B1 * | 5/2017 | Tsai | G06F 1/1626 |
| 9,910,464 B2 * | 3/2018 | Lyles | G06F 1/1669 |
| 2010/0238620 A1 * | 9/2010 | Fish | G06F 1/1681 |
| | | | 361/679.09 |
| 2013/0039000 A1 * | 2/2013 | Vicente, Jr. | G06F 1/1681 |
| | | | 361/679.41 |
| 2013/0170126 A1 * | 7/2013 | Lee | G06F 1/1681 |
| | | | 361/679.17 |
| 2016/0062402 A1 * | 3/2016 | Matsumoto | G06F 1/1632 |
| | | | 361/679.43 |
| 2016/0149597 A1 * | 5/2016 | Takasu | G06F 1/1698 |
| | | | 455/127.2 |
| 2016/0252971 A1 * | 9/2016 | Shirata | G06F 3/0231 |
| | | | 345/168 |
| 2016/0306386 A1 | 10/2016 | Tian et al. | |

FOREIGN PATENT DOCUMENTS

| | | |
|---|---|---|
| CN | 104216465 A | 12/2014 |
| CN | 204009758 U | 12/2014 |
| CN | 204087118 U | 1/2015 |
| CN | 204189086 U | 3/2015 |
| EP | 1300599 A2 | 4/2003 |
| WO | 2015131426 A1 | 9/2015 |

\* cited by examiner

COMPOSITE HINGE ASSEMBLY, MULTI-FUNCTIONAL KEYPAD AND TABLET COMPUTER KIT

CROSS-REFERENCE TO RELATED APPLICATIONS

The present application is a 35 U.S.C. § 371 National Phase conversion of International (PCT) Patent Application No. PCT/CN2017/105406 filed on Oct. 9, 2017, which claims foreign priority of Chinese Patent Application No. 201610989652.1, filed on Nov. 10, 2016 in the State Intellectual Property Office of China, the contents of all of which are hereby incorporated by reference.

TECHNICAL FIELD

The present disclosure relates to tablet computers and auxiliary accessories thereof, in particular to a composite hinge assembly, a multi-functional keypad and a tablet computer kit.

BACKGROUND

Today, with the popularity of mobile Internet technology, tablet computers, in contrast to laptops, play an important role in personal applications, allowing people to stay in close contact with the world all the time. Since the interactive mode of tablet computers relies heavily on the touch screen, its interaction efficiency in many usage scenarios is relatively low. Also, as a user needs to hold the device by hand during long-term use or viewing of the screen, the use experience is adversely affected.

Therefore, two-in-one tablets came into being. By designing a support keypad that integrates the keypad function and the support function, it is possible to provide a more efficient input method while providing support. However, as the user's requirements for the appearance and weight of portable two-in-one tablet and keypad kits increase, there is a contradiction in that a complex design will increase the product's cost, weight, and affect its appearance, while overly simple support keypads mostly can only enable a tablet computer to stand at a fixed angle, which affects user experience.

SUMMARY

In view of the deficiencies of the related art, the present disclosure provides a composite hinge assembly having a simple structure, a low manufacturing cost, and supporting multiple angles of fixation, as well as a multi-functional keypad and a tablet computer kit.

In order to achieve the above object, the present disclosure adopts the following technical solutions:

There is provided a composite hinge assembly, comprising a clamping portion and a rotating shaft portion fixed relative to the clamping portion and extending out of the two ends of the clamping portion, an inner surface of the clamping portion defining a slot and an outer surface of the clamping portion being a damping layer made of an elastic material.

In one embodiment, the outer surface of the clamping portion is a cam surface.

In one embodiment, the clamping portion comprises an inner housing and an outer housing, the slot is formed on a surface of the inner housing, the damping layer is formed on a surface of the outer housing; the outer housing comprises a curved outer wall facing the inner housing and for arranging the damping layer and side walls provided at the two end faces of the outer wall, the inner housing and the outer and side walls of the outer housing enclose a receiving cavity; the rotating shaft portion passes through the side walls and is fixed in the receiving cavity.

In one embodiment, the rotating shaft portion comprises two rotating shaft portions disposed respectively at the two ends of the outer housing.

The composite hinge assembly further comprising a mounting plate disposed in the receiving cavity, wherein the rotating shaft portion comprises a planar contact surface fastened to a surface of the mounting plate.

The composite hinge assembly further comprising a plurality of magnetic blocks disposed in the receiving cavity, the plurality of magnetic blocks being arranged in a row at a bottom of the slot.

In one embodiment, the composite hinge assembly further comprising a damping block protruding from the surface of the damping layer.

Another object of the present disclosure is to provide a multi-functional keypad comprising a keypad body and a composite hinge assembly disposed on the keypad body, wherein the composite hinge assembly includes a clamping portion and a rotating shaft portion fixed relative to the clamping portion and extending out of the two ends of the clamping portion, the clamping portion has an inner surface which defines a slot and an outer surface which is a damping layer made of an elastic material; the composite hinge assembly is rotatably disposed on the keypad body by means of the rotating shaft portion at the two ends.

In one embodiment, the outer surface of the clamping portion is a cam surface.

In one embodiment, the clamping portion comprises an inner housing and an outer housing, the slot is formed on a surface of the inner housing, the damping layer is formed on a surface of the outer housing; the outer housing comprises a curved outer wall facing the inner housing and for arranging the damping layer and side walls provided at the two end faces of the outer wall, the inner housing and the outer and side walls of the outer housing enclose a receiving cavity; the rotating shaft portion passes through the side walls and is fixed in the receiving cavity.

In one embodiment, the rotating shaft portion comprises two rotating shaft portions disposed respectively at the two ends of the outer housing.

The composite hinge assembly further comprising a mounting plate disposed in the receiving cavity, wherein the rotating shaft portion comprises a planar contact surface fastened to a surface of the mounting plate.

The composite hinge assembly further comprising a plurality of magnetic blocks disposed in the receiving cavity, the plurality of magnetic blocks being arranged in a row at a bottom of the slot.

In one embodiment, the composite hinge assembly further comprising a damping block, which protrudes from the surface of the damping layer.

Still another object of the present disclosure is to provide a tablet computer kit, comprising a tablet computer and a multi-functional keypad, the multi-functional keypad comprising a keypad body and a composite hinge assembly disposed on the keypad body, wherein the composite hinge assembly includes a clamping portion and a rotating shaft portion fixed relative to the clamping portion and extending out of the two ends of the clamping portion, the clamping portion has an inner surface which defines a slot and an outer surface which is a damping layer made of an elastic material;

the composite hinge assembly is rotatably disposed on the keypad body by means of the rotating shaft portion at the two ends, and the tablet computer configured to be inserted into the slot.

In one embodiment, the outer surface of the clamping portion is a cam surface.

In one embodiment, the clamping portion comprises an inner housing and an outer housing, the slot is formed on a surface of the inner housing, the damping layer is formed on a surface of the outer housing; the outer housing comprises a curved outer wall facing the inner housing and for arranging the damping layer and side walls provided at the two end faces of the outer wall, the inner housing and the outer and side walls of the outer housing enclose a receiving cavity; the rotating shaft portion passes through the side walls and is fixed in the receiving cavity.

The composite hinge assembly further comprising a mounting plate disposed in the receiving cavity, wherein the rotating shaft portion comprises a planar contact surface fastened to a surface of the mounting plate.

The composite hinge assembly further comprising a plurality of magnetic blocks disposed in the receiving cavity, the plurality of magnetic blocks being arranged in a row at a bottom of the slot.

In one embodiment, the composite hinge assembly further comprising a damping block, which protrudes from the surface of the damping layer.

The present disclosure provides a composite hinge assembly and applies it to a multi-functional keypad. Since the surface of the composite hinge assembly has a damping layer made of an elastic material, the rotating shaft can be stably fixed in any desired angle after the tablet computer is mounted on the multi-functional keypad. Such a design is simple in structure, has a low manufacturing cost, and improves the appearance and operational reliability of the multi-functional keypad.

DETAILED DESCRIPTION

The present disclosure will be further described in detail below with reference to the accompanying drawings and embodiments. It is understood that the specific embodiments described herein are illustrative only and are not intended to limit the present disclosure.

Figure 1:
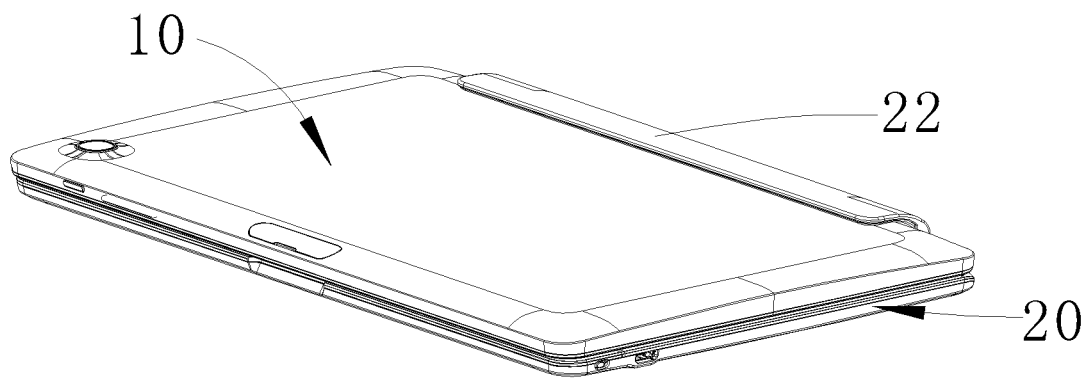
FIG. 1 is a schematic diagram of a use state of a multi-functional keypad according to an embodiment of the present disclosure.
Figure 2:
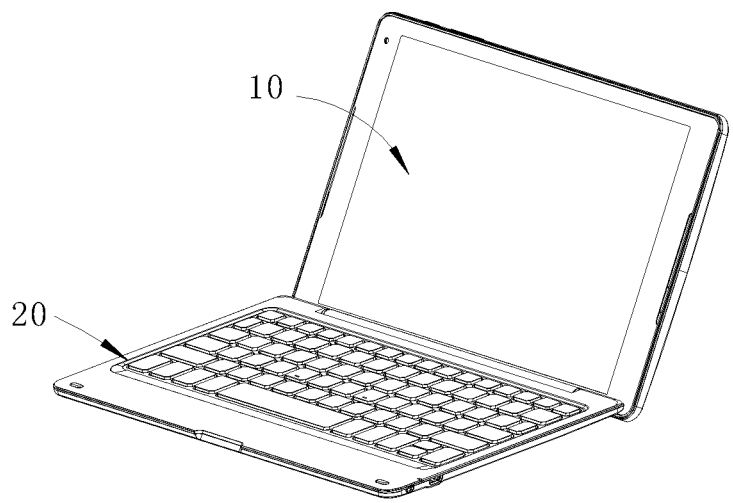
FIG. 2 is a schematic diagram of another use state of a multi-functional keypad according to an embodiment of the present disclosure.
Figure 3:
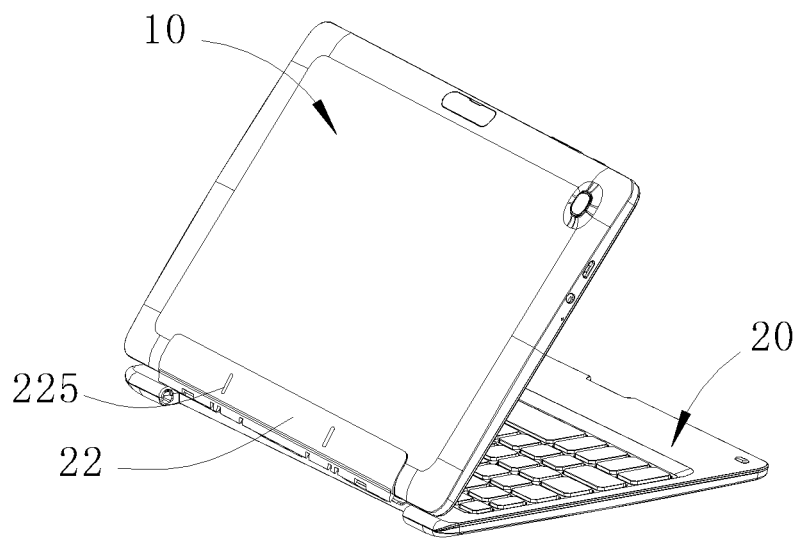
FIG. 3 is a schematic diagram of still another use state of a multi-functional keypad according to an embodiment of the present disclosure.

FIGS. 1 to 3 are schematic diagrams showing multiple use states of a multi-functional keypad according to embodiments of the present disclosure. FIG. 1 is a state in which a tablet computer 10 is completely closed; FIG. 2 is a state where the tablet computer 10 is opened at an obtuse angle with respect to the multi-functional keypad 20; and FIG. 3 is a state where the tablet computer 10 is opened at an acute angle with respect to the multi-functional keypad 20.

Figure 4:
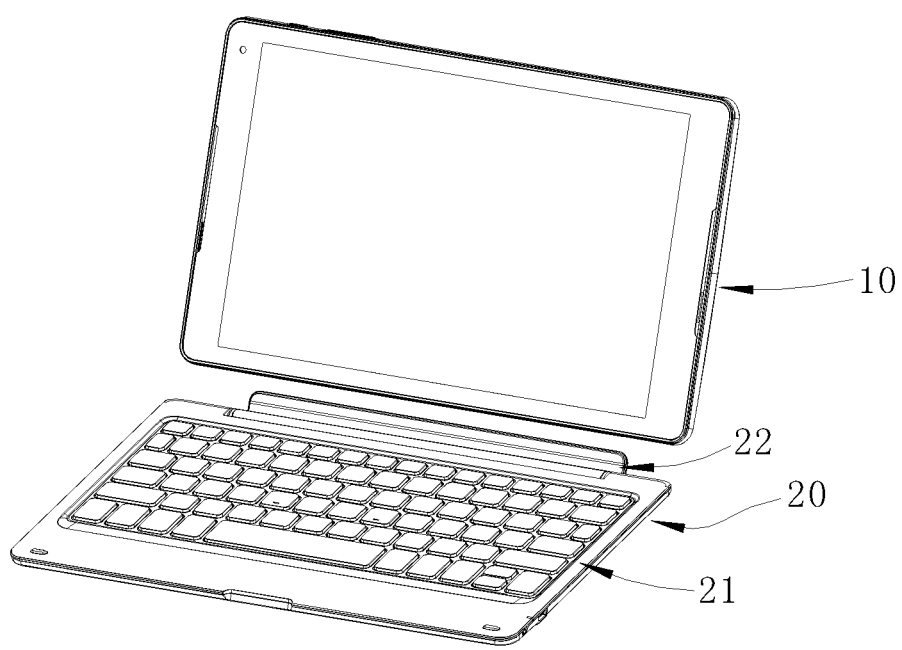
FIG. 4 is a schematic exploded view of a tablet computer kit according to an embodiment of the present disclosure.
Figure 5:
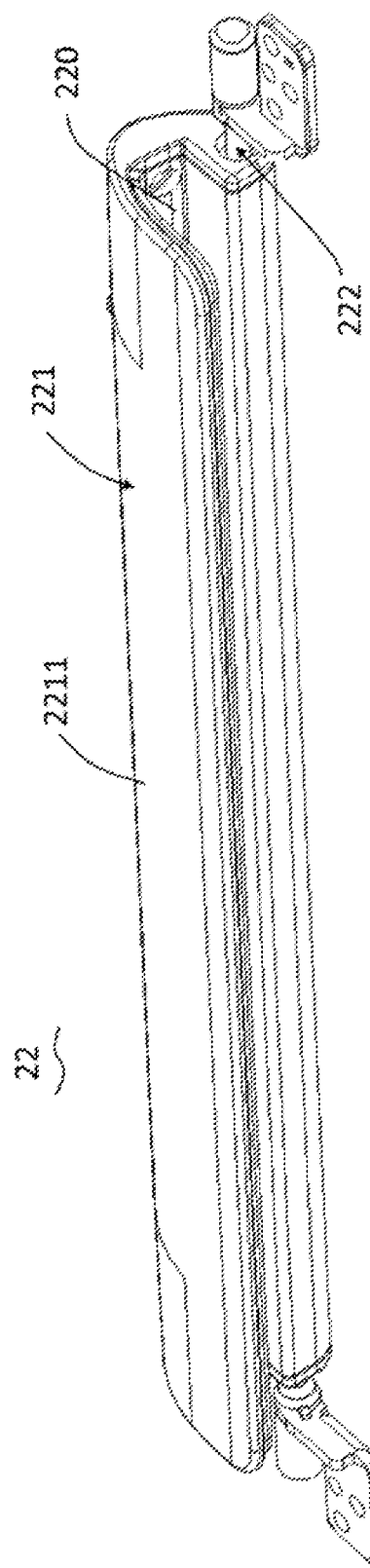
FIG. 5 is a schematic structural view of a composite hinge assembly according to an embodiment of the present disclosure.

As shown in FIG. 4, the tablet computer 10 and the multi-functional keypad 20 constitute tablet computer kit. The multi-functional keypad 20 of the present embodiment may have a keypad body 21 and a composite hinge assembly 22 disposed at one end of the keypad body 21. With reference to FIG. 5, the composite hinge assembly 22 may be rotatably disposed on the keypad body 21 through the rotating shaft portion 222 at the two ends. The tablet computer 10 may be freely disposed at any desired angles relative to the multi-functional keypad 20 while being inserted into a slot 220 of the multi-functional keypad 20.

Figure 6:
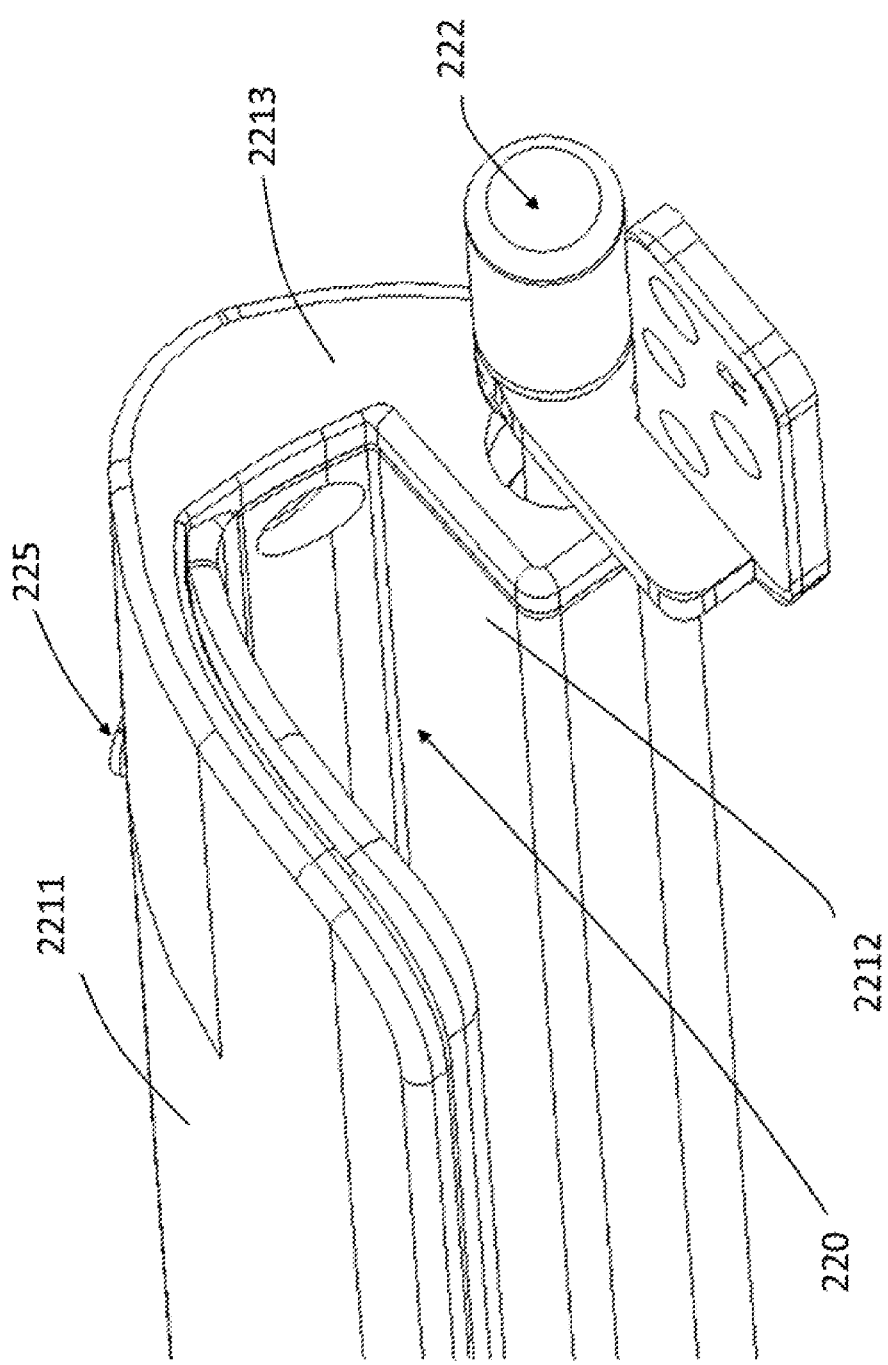
FIG. 6 is a partial enlarged view of a composite hinge assembly according to an embodiment of the present disclosure.

The structure of the composite hinge assembly 22 ensures an arbitrary opening angle of the tablet computer 10. As shown in FIGS. 5 and 6, the composite hinge assembly of the present embodiment may include a clamping portion 221 and a rotating shaft portion 222 fixed relative to the clamping portion 221 and extending out of the two ends of the clamping portion 221. A inner surface of the clamping portion 221 may define the slot 220 and a outer surface thereof may be a damping layer 2211 made of an elastic material. After the tablet computer 10 is inserted into the slot 220, as the clamping portion 221 is rotated about the rotating shaft portion 222 relative to the keypad body 21, the damping layer 2211 is pressed and comes into elastic contact with the keypad body 21, thereby enabling the tablet computer 10 to be stably disposed at any desired opening angles.

In one embodiment, the damping layer 2211 may be made of a silica gel, the clamping portion 221 may be made of plastic, and both the silica gel and the plastic may be hot pressed by a mold using glue. Here, owing to the frictional performance of the silica gel, it is possible to achieve a good engagement between the tablet computer 10 and the multi-functional keypad 20 without needing any mechanical structure at the junction thereof while allowing the tablet computer 10 to be rotated freely.

According to one embodiment, the outer surface of the clamping portion 221 may be a cam surface centered on the rotating shaft portion 222. As the clamping portion 221 is rotated to a larger angle, the damping layer 2211 will be pressed to a larger extent, such that the pressing force is offset by the turning force generated by the gravity of the tablet computer 10 to achieve a stable positioning.

It will be understood that the rotating mechanism between the rotating shaft portion 222 at the two ends and the keypad body 21 can be one known in the related art, which is not described herein. For example, the rotating shaft portion 222 may be sleeved with a torsion spring to provide a partial torsion force required for closing the clamping portion 221.

Figure 7:
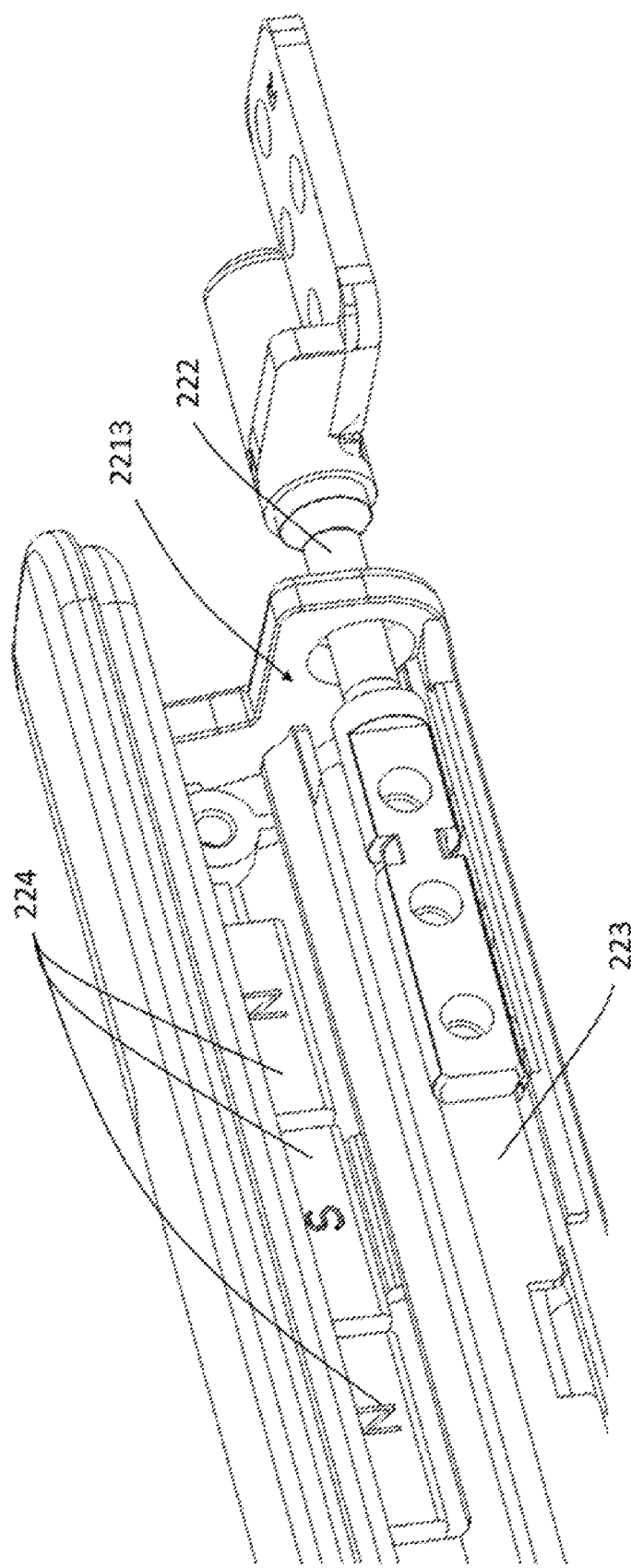
FIG. 7 is a schematic diagram showing the internal structure of a composite hinge assembly according to an embodiment of the present disclosure.

With reference to FIGS. 6 and 7, the clamping portion 221 may include an inner housing 2212 and an outer housing 2213. The slot 220 may be formed on a surface of the inner housing 2212, and the damping layer 2211 may be formed on a surface of the outer housing 2213. The outer housing 2213 may include a curved outer wall facing the inner housing 2212 and for arranging the damping layer 2211 and side walls provided at the two end faces of the outer wall. The inner housing 2212 and the outer and side walls of the outer housing 2213 may enclose a receiving cavity. The rotating shaft portion 222 passes through the side walls and may be secured within the receiving cavity.

Figure 8:
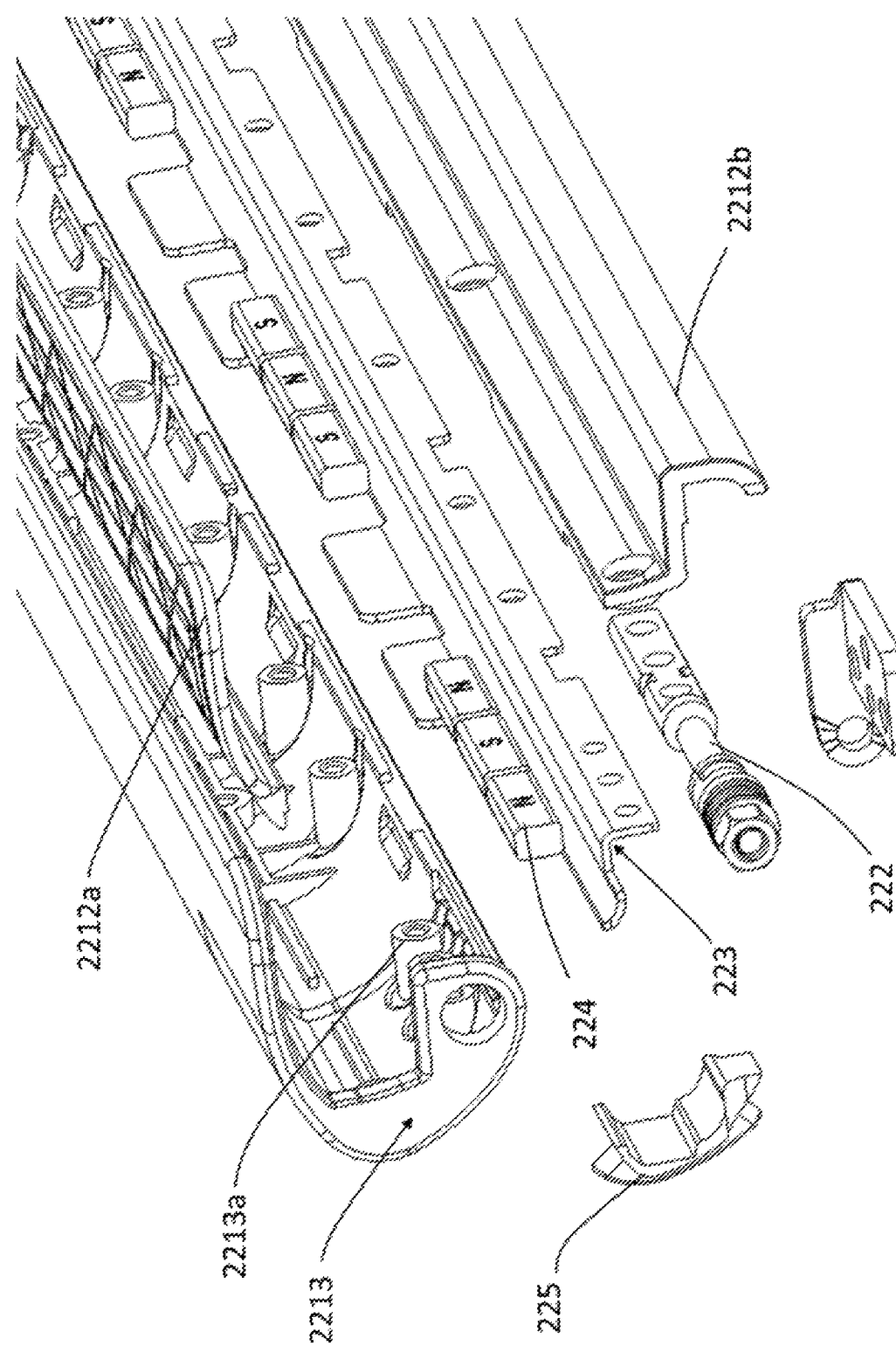
FIG. 8 is a schematic exploded view showing the structure of a composite hinge assembly according to an embodiment of the present disclosure.

In one embodiment, there may be two rotating shaft portions 222, which may be provided at the two ends of the outer housing 2213, respectively. As shown in FIG. 8, a mounting plate 223, a plurality of magnetic blocks 224, and a damping block 225 may be disposed in the receiving cavity of the composite hinge assembly 22.

A inner surface of the outer housing 2213 may be provided with a plurality of studs 2213*a* protruding therefrom. The mounting plate 223 may be fixed to end surfaces of the plurality of studs 2213*a* by threaded fasteners. The surface of the rotating shaft portions 222 may be flattened to form a planar contact surface (not shown), which may be fastened to a corresponding surface of the mounting plate 223.

The plurality of magnetic blocks 224 may be arranged in a row at a bottom of the slot 220, that is, the plurality of magnetic blocks 224 may be fixed to the inner surface of the curved outer wall of the outer housing 2213 corresponding to the bottom of the slot 220. When the tablet computer 10 is inserted into the slot 220, the plurality of magnetic blocks 224 are attracted to the metal shell of the tablet computer 10 or corresponding magnets in the tablet computer 10, so that the tablet computer 10 is firmly attracted in the slot 220. In one embodiment, the magnetic poles of two adjacent magnetic blocks 224 may be opposite to form a magnetic field superposition, thus increasing the overall adsorption force of the plurality of magnetic blocks 224.

The damping block 225 may be made of a silica gel or rubber. The damping block 225 may be protruded from a surface of the damping layer 2211 and may extend along a circumferential direction of the clamping portion 221. After the clamping portion 221 is rotated to the maximum opening angle, the damping block 225 will abut against a upper surface of the keypad body 21, which restricts the maximum opening angle. In one embodiment, there may be two damping blocks 225 which are disposed at two ends of the clamping portion 221, respectively.

Figure 9:
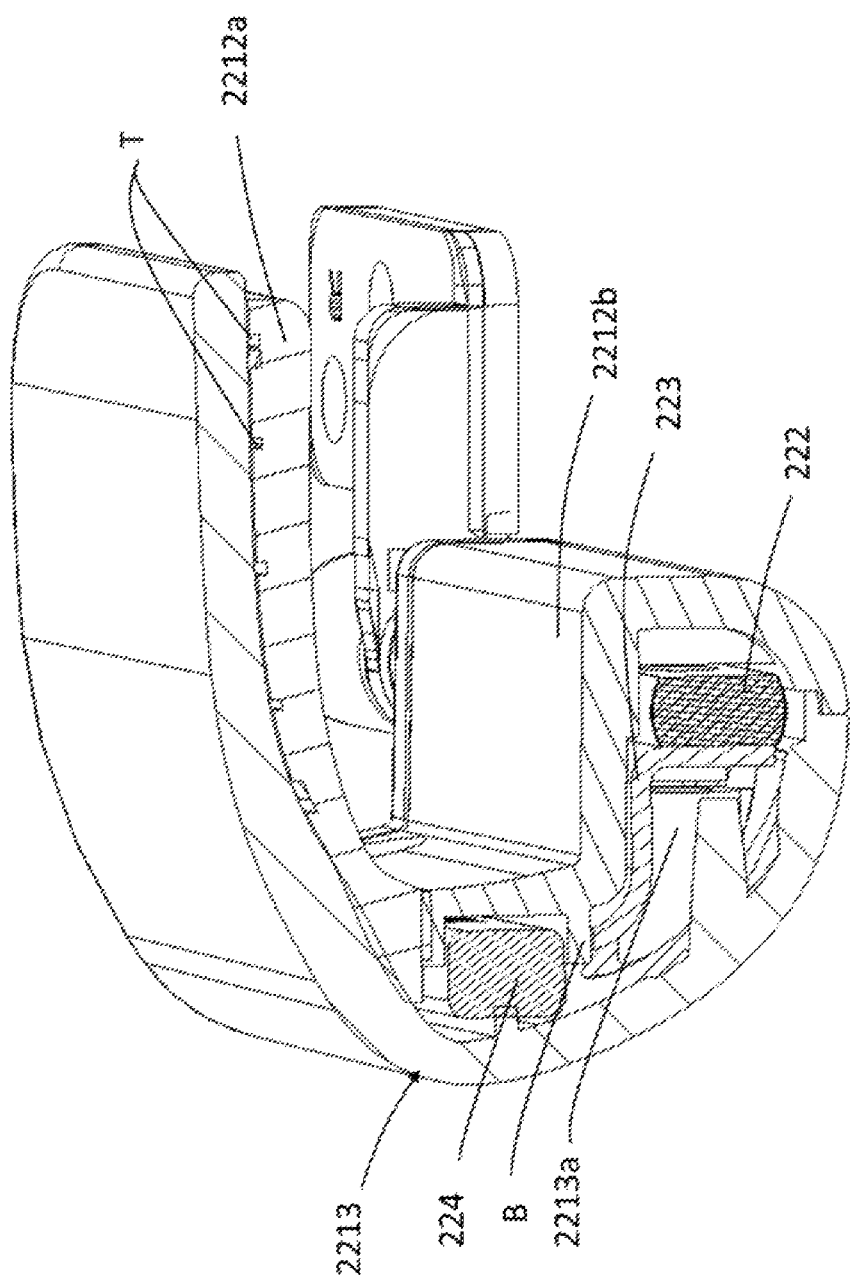
FIG. 9 is a cross-sectional structural view of a composite hinge assembly according to an embodiment of the present disclosure.
Figure 10:
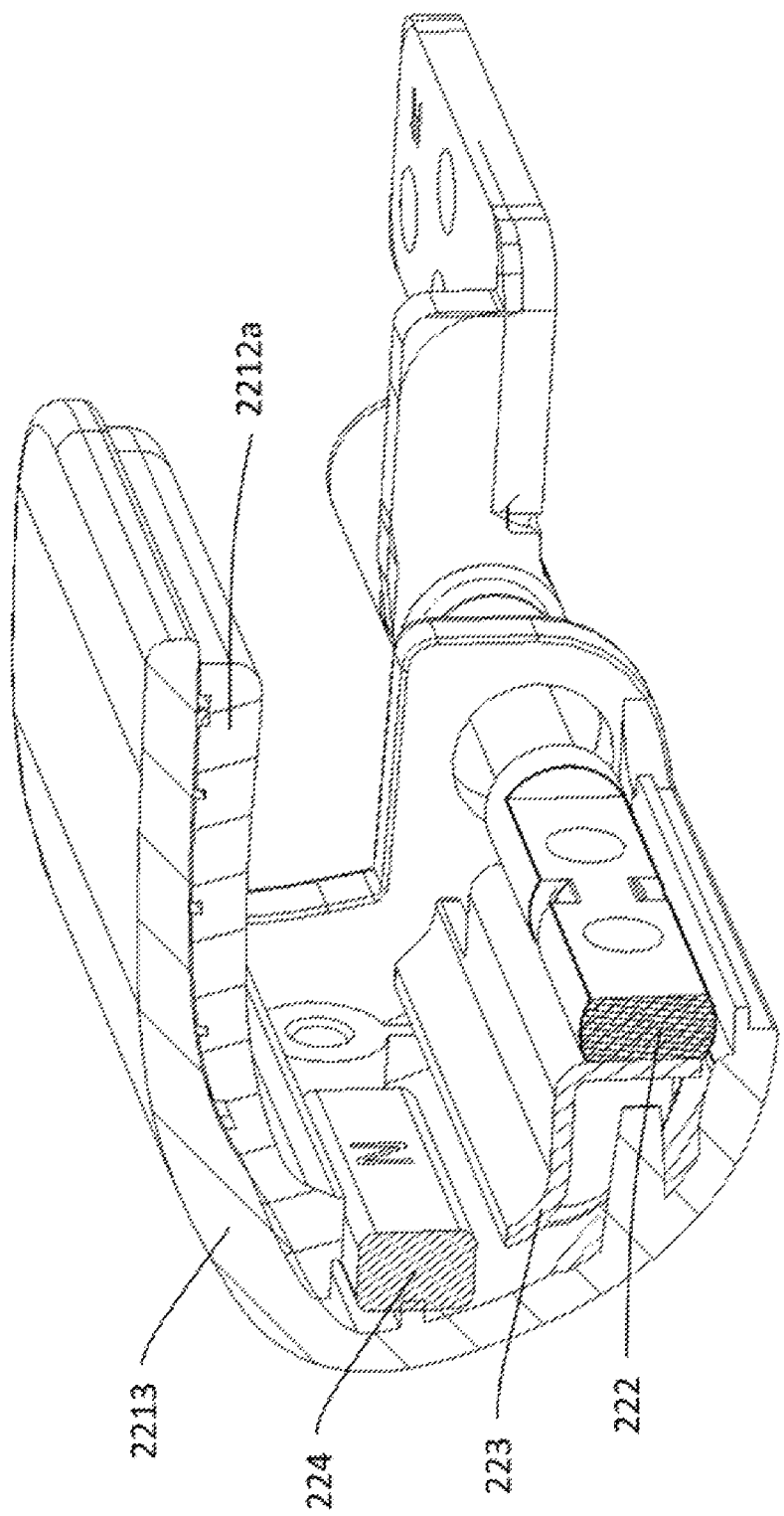
FIG. 10 is a cross-sectional view showing the internal structure of a composite hinge assembly according to an embodiment of the present disclosure.

With reference to FIGS. 8 to 10, the receiving cavity of the composite hinge assembly 22 of the present embodiment may be formed in the following manner: the inner housing 2212 may be composed of an upper housing 2212*a* and a lower housing 2212*b*. A top inner surface of the outer housing 2213 may be provided with a plurality of spaced-apart protruding lugs T, and a top surface of the upper housing 2212*a* may be correspondingly provided with a plurality of recesses (not shown), such that the plurality of protruding lugs T mate with the plurality of recesses to secure the upper housing 2212*a* with the outer housing 2213. The lower housing 2212*b* may include a first end that engages the bottom of the outer housing 2213 and a second end that abuts the upper housing 2212*a*. The lower housing 2212*b* may be then secured relative to the outer housing 2213 through threaded fasteners.

A part of the mounting plate 223 may be fixed to the end surfaces of the plurality of studs 2213*a* by threaded fasteners, and a free end of the other part of the mounting plate 223 may extend toward a lower end surface of the upper housing 2212*a*. A inner surface of the lower housing 2212*b* may be further provided with a spacer B protruding therefrom. The spacer B may separate the mounting space of the plurality of magnetic blocks 224 from the mounting plate 223. The free end of the mounting plate 223 may be opposite to the spacer B. In one embodiment, the mounting plate 223 may be made of a metal. The mounting plate 223 may also be used to reinforce the lower housing 2212*b* if necessary.

By combining the various components flexibly and reasonably, the tablet computer kit allows the components to be used alone or in combination; the weight and volume of the multi-functional keypad are not significantly increased, and the composite hinge assembly has good structural strength, such that the structure is simple and the cost can be controlled. By defining various interfaces on the multi-functional keypad, it is possible to increase the extensibility and functional variety of the tablet computer.

The present disclosure provides a composite hinge assembly and applies it to a multi-functional keypad. Since the surface of the composite hinge assembly has a damping layer made of an elastic material, the rotating shaft can be stably fixed in any desired angle after the tablet computer is mounted on the multi-functional keypad. Such a design is simple in structure, has a low manufacturing cost, and improves the appearance and operational reliability of the multi-functional keypad.

While the above description sets forth specific embodiments of the present disclosure, it should be noted that improvements and modifications can be made by those of ordinary skills without departing from the principle of the present disclosure, which improvements and modifications should be considered to be within the scope of protection of present disclosure.

What is claimed is:

1. A composite hinge assembly for a multi-functional keypad with a keypad body, comprising a clamping portion and a rotating shaft portion fixed relative to the clamping portion and extending out of two ends of the clamping portion, the clamping portion having an inner surface defining a slot and an outer surface which is a damping layer made of an elastic material;

wherein the damping layer is configured to be pressed to come into an elastic contact with the keypad body as the clamping portion is rotated about the rotating shaft portion relative to the keypad body to enable a tablet computer inserted into the slot to be disposed at any desired stable opening angles relative to the keypad body.

2. The composite hinge assembly according to claim 1, wherein the outer surface of the clamping portion is a cam surface.

3. The composite hinge assembly according to claim 1, wherein the clamping portion comprises an inner housing and an outer housing, the slot is formed on a surface of the inner housing, the damping layer is formed on a surface of the outer housing; the outer housing comprises a curved outer wall facing the inner housing and for arranging the damping layer and side walls provided at the two end faces of the outer wall, the inner housing and the outer and side walls of the outer housing enclose a receiving cavity; the rotating shaft portion passes through the side walls and is fixed in the receiving cavity.

4. The composite hinge assembly according to claim 3, wherein the rotating shaft portion comprises two rotating shaft portions disposed respectively at the two ends of the outer housing.

5. The composite hinge assembly according to claim 3, further comprising a mounting plate disposed in the receiving cavity, wherein the rotating shaft portion comprises a planar contact surface fastened to a surface of the mounting plate.

6. The composite hinge assembly according to claim 3, further comprising a plurality of magnetic blocks disposed in the receiving cavity, the plurality of magnetic blocks being arranged in a row at a bottom of the slot.

7. The composite hinge assembly according to claim 1, further comprising a damping block protruding from a surface of the damping layer;
wherein the damping block extends along a circumferential direction of the clamping portion, and abuts against an upper surface of the keypad body to restrict the clamping portion relative to the rotating shaft portion when the clamping portion is rotated to a maximum opening angle.

8. A multi-functional keypad comprising a keypad body and a composite hinge assembly disposed on the keypad body, wherein the composite hinge assembly comprises a clamping portion and a rotating shaft portion fixed relative to the clamping portion and extending out of two ends of the clamping portion, the clamping portion has an inner surface which defines a slot and an outer surface which is a damping layer made of an elastic material; the composite hinge assembly is rotatably disposed on the keypad body by means of the rotating shaft portion at the two ends;
wherein the damping layer is configured to be pressed to come into an elastic contact with the keypad body as the clamping portion is rotated about the rotating shaft portion relative to the keypad body to enable a tablet computer inserted into the slot to be disposed at any desired stable opening angles relative to the keypad body.

9. The multi-functional keypad according to claim 8, wherein the outer surface of the clamping portion is a cam surface.

10. The multi-functional keypad according to claim 8, wherein the clamping portion comprises an inner housing and an outer housing, the slot is formed on a surface of the inner housing, the damping layer is formed on a surface of the outer housing; the outer housing comprises a curved outer wall facing the inner housing and for arranging the damping layer and side walls provided at the two end faces of the outer wall, the inner housing and the outer and side walls of the outer housing enclose a receiving cavity; the rotating shaft portion passes through the side walls and is fixed in the receiving cavity.

11. The multi-functional keypad according to claim 10, wherein the rotating shaft portion comprises two rotating shaft portions disposed respectively at the two ends of the outer housing.

12. The multi-functional keypad according to claim 10, further comprising a mounting plate disposed in the receiving cavity, wherein the rotating shaft portion comprises a planar contact surface fastened to a surface of the mounting plate.

13. The multi-functional keypad according to claim 10, further comprising a plurality of magnetic blocks disposed in the receiving cavity, the plurality of magnetic blocks being arranged in a row at a bottom of the slot.

14. The multi-functional keypad according to claim 8, wherein the composite hinge assembly further includes a damping block protruding from a surface of the damping layer;
wherein the damping block extends along a circumferential direction of the clamping portion, and abuts against an upper surface of the keypad body to restrict the clamping portion relative to the rotating shaft portion when the clamping portion is rotated to a maximum opening angle.

15. A tablet computer kit, comprising a tablet computer and a multi-functional keypad, the multi-functional keypad comprising a keypad body and a composite hinge assembly disposed on the keypad body, wherein the composite hinge assembly comprises a clamping portion and a rotating shaft portion fixed relative to the clamping portion and extending out of two ends of the clamping portion, the clamping portion has an inner surface which defines a slot and an outer surface which is a damping layer made of an elastic material; the composite hinge assembly is rotatably disposed on the keypad body by means of the rotating shaft portion at the two ends, and the tablet computer configured to be inserted into the slot;
wherein the damping layer is configured to be pressed to come into an elastic contact with the keypad body as the clamping portion is rotated about the rotating shaft portion relative to the keypad body to enable the tablet computer to be disposed at any desired stable opening angles relative to the keypad body.

16. The tablet computer kit according to claim 15, wherein the outer surface of the clamping portion is a cam surface.

17. The tablet computer kit according to claim 15, wherein the clamping portion comprises an inner housing and an outer housing, the slot is formed on a surface of the inner housing, the damping layer is formed on a surface of the outer housing; the outer housing comprises a curved outer wall facing the inner housing and for arranging the damping layer and side walls provided at the two end faces of the outer wall, the inner housing and the outer and side walls of the outer housing enclose a receiving cavity; the rotating shaft portion passes through the side walls and is fixed in the receiving cavity.

18. The tablet computer kit according to claim 17, further comprising a mounting plate disposed in the receiving cavity, wherein the rotating shaft portion comprises a planar contact surface fastened to a surface of the mounting plate.

19. The tablet computer kit according to claim 17, further comprising a plurality of magnetic blocks disposed in the receiving cavity, the plurality of magnetic blocks being arranged in a row at a bottom of the slot.

20. The tablet computer kit according to claim 15, wherein the composite hinge assembly further includes a damping block protruding from a surface of the damping layer;
wherein the damping block extends along a circumferential direction of the clamping portion, and abuts against an upper surface of the keypad body to restrict the clamping portion relative to the rotating shaft portion when the clamping portion is rotated to a maximum opening angle.

* * * * *